United States Patent
Pogue et al.

(10) Patent No.: US 9,747,899 B2
(45) Date of Patent: Aug. 29, 2017

(54) DETECTING SELF-GENERATED WAKE EXPRESSIONS

(71) Applicant: Amazon Technologies, Inc., Seattle, WA (US)

(72) Inventors: Michael Alan Pogue, Sunnyvale, CA (US); Philip Ryan Hilmes, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 580 days.

(21) Appl. No.: 13/929,540

(22) Filed: Jun. 27, 2013

(65) Prior Publication Data
US 2015/0006176 A1    Jan. 1, 2015

(51) Int. Cl.
*G10L 15/22* (2006.01)
*G10L 15/08* (2006.01)
(Continued)

(52) U.S. Cl.
CPC ........ *G10L 15/22* (2013.01); *G10L 2015/088* (2013.01); *G10L 2021/02087* (2013.01); *G10L 2021/02166* (2013.01)

(58) Field of Classification Search
CPC ... G10L 15/22; G10L 2015/223; G10L 15/00; G10L 15/02; G10L 2015/088; G10L 2012/02166
(Continued)

(56) References Cited

U.S. PATENT DOCUMENTS

| 5,086,385 A * | 2/1992 | Launey ............... G06F 3/04847 340/6.11 |
| 6,219,645 B1 * | 4/2001 | Byers ..................... G10L 15/02 381/91 |

(Continued)

FOREIGN PATENT DOCUMENTS

| JP | 2012208218 | 10/2012 |
| WO | WO2007138503 | 12/2007 |

(Continued)

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

(Continued)

*Primary Examiner* — Jakieda Jackson
(74) *Attorney, Agent, or Firm* — Lee & Hayes, PLLC

(57) ABSTRACT

A speech-based audio device may be configured to detect a user-uttered wake expression and to respond by interpreting subsequent words or phrases as commands. In order to distinguish between utterance of the wake expression by the user and generation of the wake expression by the device itself, directional audio signals may by analyzed to detect whether the wake expression has been received from multiple directions. If the wake expression has been received from many directions, it is declared as being generated by the audio device and ignored. Otherwise, if the wake expression is received from a single direction or a limited number of directions, the wake expression is declared as being uttered by the user and subsequent words or phrase are interpreted and acted upon by the audio device.

17 Claims, 5 Drawing Sheets

(51) Int. Cl.
*G10L 21/0208* (2013.01)
*G10L 21/0216* (2013.01)

(58) Field of Classification Search
USPC .......................................................... 704/275
See application file for complete search history.

(56) References Cited

U.S. PATENT DOCUMENTS

| | | | |
|---|---|---|---|
| 6,230,137 B1* | 5/2001 | Has | G10L 15/22 704/270 |
| 7,418,392 B1 | 8/2008 | Mozer et al. | |
| 7,698,136 B1* | 4/2010 | Nguyen | G10L 15/08 704/231 |
| 7,720,683 B1* | 5/2010 | Vermeulen | G10L 15/22 704/235 |
| 7,774,204 B2 | 8/2010 | Mozer et al. | |
| 8,054,990 B2* | 11/2011 | Gratke | B60R 16/0373 381/122 |
| 8,798,995 B1* | 8/2014 | Edara | G06Q 30/0255 704/211 |
| 8,918,121 B2* | 12/2014 | LeBeau | G10L 15/265 455/404.2 |
| 2004/0019489 A1* | 1/2004 | Funk | H04L 12/2803 704/275 |
| 2008/0059192 A1 | 3/2008 | Trinkel et al. | |
| 2008/0262849 A1* | 10/2008 | Buck | G10L 15/28 704/275 |
| 2009/0043580 A1 | 2/2009 | Mozer et al. | |
| 2009/0055170 A1 | 2/2009 | Nagahama | |
| 2010/0030558 A1 | 2/2010 | Herbig et al. | |
| 2010/0211387 A1* | 8/2010 | Chen | G10L 25/78 704/226 |
| 2010/0225461 A1* | 9/2010 | Tuli | G01S 3/8036 340/436 |
| 2010/0333163 A1* | 12/2010 | Daly | H04N 5/4403 725/133 |
| 2011/0142253 A1* | 6/2011 | Hata | G11B 20/10527 381/92 |
| 2011/0165912 A1* | 7/2011 | Wang | G10L 13/033 455/563 |
| 2012/0223885 A1 | 9/2012 | Perez | |
| 2012/0265538 A1* | 10/2012 | Gustafsson | G10L 21/16 704/275 |
| 2012/0269332 A1 | 10/2012 | Mukund | |
| 2013/0054235 A1 | 2/2013 | Mozer et al. | |
| 2013/0085757 A1 | 4/2013 | Nakamura et al. | |
| 2014/0095176 A1* | 4/2014 | Kim | H04N 5/4403 704/275 |
| 2014/0156281 A1* | 6/2014 | Boyd | H04L 12/281 704/275 |
| 2014/0229184 A1* | 8/2014 | Shires | H04L 12/12 704/275 |
| 2014/0244267 A1* | 8/2014 | Levi | G06F 3/167 704/275 |
| 2014/0330569 A1* | 11/2014 | Kolavennu | G10L 21/16 704/275 |
| 2014/0358553 A1* | 12/2014 | Helmke | G10L 15/22 704/275 |
| 2015/0170664 A1* | 6/2015 | Doherty | G06F 3/167 704/275 |
| 2015/0350760 A1* | 12/2015 | Nandy | G10L 25/78 381/110 |

FOREIGN PATENT DOCUMENTS

WO  WO2011088053 A2  7/2011
WO  WO2014124332     8/2014

OTHER PUBLICATIONS

The PCT Search Report and Written Opinion mailed Apr. 7, 2015 for PCT application No. PCT/US2014/044455, 7 pages.
The Extended European Search Report mailed Oct. 27, 2016 for European patent application No. 14817855.1, 10 pages.
Translated Japanese Office Action dated Jun. 6, 2017 for Japanese Patent Application No. 2016-524222, a counterpart foreign application of U.S. Appl. No. 13/929,540, 10 pages.
Suzuki, et al., "Automatic detection and estimation of the direction of calling speech under noisy environment," IEICE Technical Report, The Institute of Electronics, Information and Communication Engineers, vol. 107, No. 116, Jun. 21, 2007, pp. 67-72.

* cited by examiner

DETECTING SELF-GENERATED WAKE EXPRESSIONS

BACKGROUND

Homes, offices, automobiles, and public spaces are becoming more wired and connected with the proliferation of computing devices such as notebook computers, tablets, entertainment systems, and portable communication devices. As computing devices evolve, the way in which users interact with these devices continues to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that capture and respond to human speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3 and 4 are block diagrams illustrating functionality that may be implemented to discriminate between user-uttered wake expressions and device-produced wake expressions.

DETAILED DESCRIPTION

Figure 1:
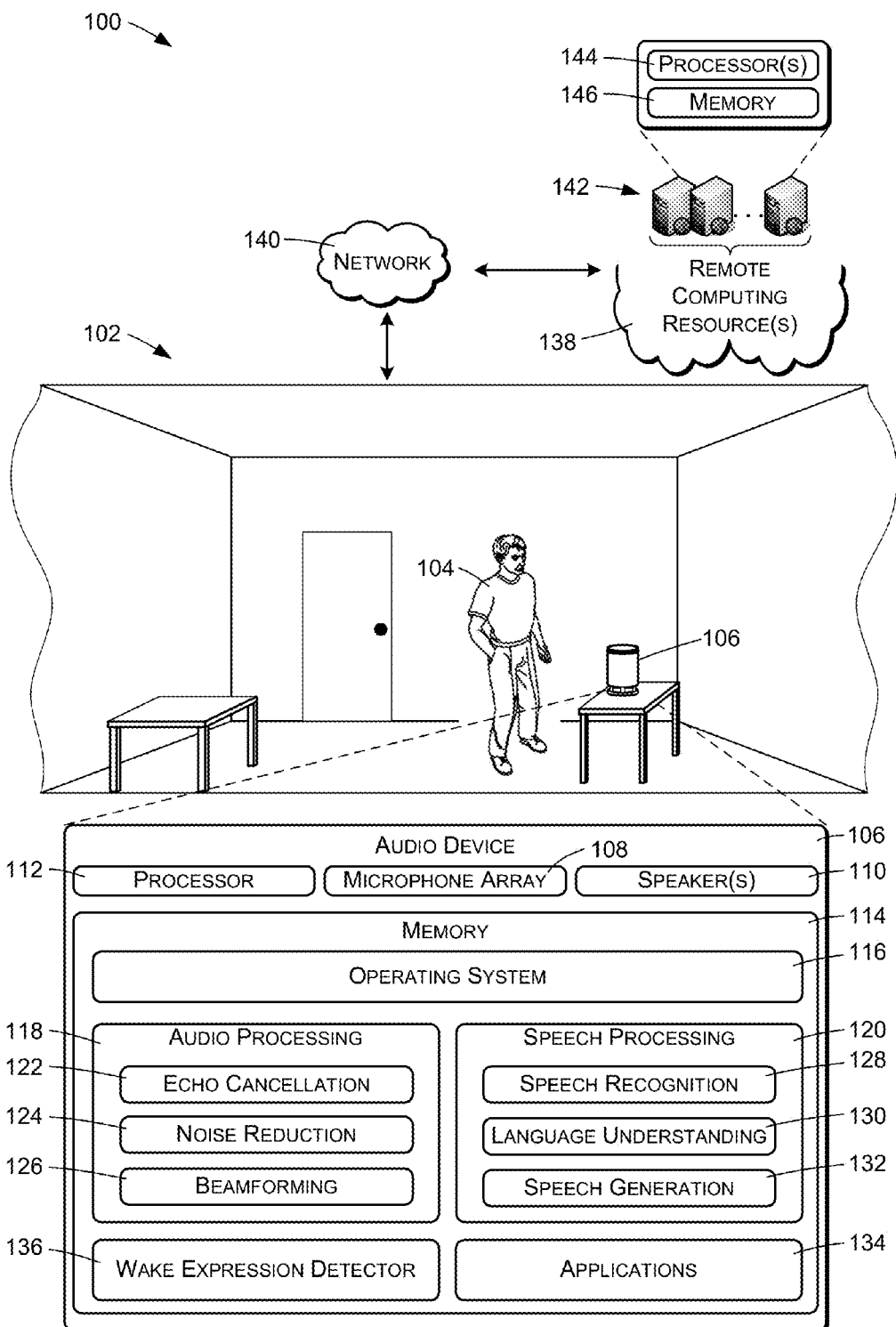
FIG. 1 is a block diagram of an illustrative voice interaction computing architecture that includes a voice-controlled audio device.

This disclosure pertains generally to a speech interface device or other audio device that provides speech-based interaction with a user. The audio device has a speaker that produces audio within the environment of a user and a microphone that captures user speech. The audio device may be configured to respond to user speech by performing functions and providing services. User commands may be prefaced by a wake expression, also referred to as a trigger expression, such as a predefined word, phrase, or other sound. In response to detecting the wake expression, the audio device interprets any immediately following words or phrases as actionable input or commands.

In providing services to the user, the audio device may itself generate the wake expression at its speaker, which may cause the audio device to react as if the user has spoken the wake expression. To avoid this, the audio device may be configured to evaluate the direction or directions from which the wake expression has been received. Generally, a wake expression generated by the audio device will be received omnidirectionally. A wake expression generated by a user, on the other hand, will be received from one direction or a limited number of directions. Accordingly, the audio device may be configured to ignore wake expressions that are received omnidirectionally, or from more than one or two directions. Note that a user-uttered wake expression may at times seem to originate from more than a single direction due to acoustic reflections within a particular environment.

More particularly, an audio device may be configured to perform wake expression detection with respect to multiple directional audio signals. The audio device may be further configured to compare the number or pattern of the directional audio signals containing the wake expression to a reference. The reference may indicate a threshold number of directional input signals or a pattern or set of the directional signals. When the reference comprises a threshold, the wake expression is considered to have been generated by the audio device if the number of directional input audio signals containing the wake expression exceeds the threshold. When the reference comprises a pattern or set, the wake expression is evaluated based on whether the particular directional input audio signals containing the wake expression match those of the pattern or set.

In some implementations, the audio device may be configured to learn or to train itself regarding patterns of audio characteristics are characteristic of device-generated wake expressions. For example, the audio device may be configured to generate the wake expression or another sound upon initialization, and to identify a combination of the directional audio signals in which the expression or sound is detected. Subsequently, the audio device may be configured to ignore the wake expression when it is detected in the learned combination of directional audio signals.

Other conditions or parameters may also be analyzed or considered when determining whether a detected wake expression has been generated by the audio device rather than by the user. As examples, such conditions or parameters may include the following: presence and/or loudness of speaker output; whether the speaker output is known to contain speech; echo characteristics input signals and/or effectiveness of echo reduction; loudness of received audio signals including directional audio signals.

Machine learning techniques may be utilized to analyze various parameters in order to determine patterns of parameters that are typically exhibited when a wake expression has been self-generated.

FIG. 1 shows an illustrative voice interaction computing architecture 100 set in an environment 102, such as a home environment, that includes a user 104. The architecture 100 includes an electronic, voice-controlled audio device 106 with which the user 104 may interact. In the illustrated implementation, the audio device 106 is positioned on a table within a room of the environment 102. In other implementations, the audio device 106 may be placed in any number of locations (e.g., ceiling, wall, in a lamp, beneath a table, under a chair, etc.). Furthermore, more than one audio device 106 may be positioned in a single room, or one audio device 106 may be used to accommodate user interactions from more than one room.

Generally, the audio device 106 may have a microphone array 108 and one or more audio speakers or transducers 110 to facilitate audio interactions with the user 104 and/or other users. The microphone array 108 produces input audio signals representing audio from the environment 102, such as sounds uttered by the user 104 and ambient noise within the environment 102. The input audio signals may also contain output audio components that have been produced by the speaker 110. As will be described in more detail below, the input audio signals produced by the microphone array 108 may comprise directional audio signals or may be used to produce directional audio signals, where each of the directional audio signals emphasizes audio from a different direction relative to the microphone array 108.

The audio device 106 includes operational logic, which in many cases may comprise a processor 112 and memory 114. The processor 112 may include multiple processors and/or a processor having multiple cores. The memory 114 may contain applications and programs in the form of instructions that are executed by the processor 112 to perform acts or actions that implement desired functionality of the audio device 106, including the functionality specifically described below. The memory 114 may be a type of computer storage media and may include volatile and nonvolatile memory. Thus, the memory 114 may include, but is not limited to, RAM, ROM, EEPROM, flash memory, or other memory technology.

The audio device 106 may have an operating system 116 that is configured to manage hardware and services within and coupled to the audio device 106. In addition, the audio device 106 may include audio processing components 118 and speech processing components 120.

The audio processing components 118 may include functionality for processing input audio signals generated by the microphone array 108 and/or output audio signals provided to the speaker 110. As an example, the audio processing components 118 may include an acoustic echo cancellation or suppression component 122 for reducing acoustic echo generated by acoustic coupling between the microphone array 108 and the speaker 110. The audio processing components 118 may also include a noise reduction component 124 for reducing noise in received audio signals, such as elements of audio signals other than user speech.

The audio processing components 118 may include one or more audio beamformers or beamforming components 126 that are configured to generate an audio signal that is focused in a direction from which user speech has been detected. More specifically, the beamforming components 126 may be responsive to spatially separated microphone elements of the microphone array 108 to produce directional audio signals that emphasize sounds originating from different directions relative to the audio device 106, and to select and output one of the audio signals that is most likely to contain user speech.

The speech processing components 120 receive an audio signal that has been processed by the audio processing components 118 and perform various types of processing in order to understand the intent expressed by human speech. The speech processing components 120 may include an automatic speech recognition component 128 that recognizes human speech in the audio represented by the received audio signal. The speech processing components 120 may also include a natural language understanding component 130 that is configured to determine user intent based on recognized speech of the user 104.

The speech processing components 120 may also include a text-to-speech or speech generation component 132 that converts text to audio for generation at the speaker 110.

The audio device 106 may include a plurality of applications 134 that are configured to work in conjunction with other elements of the audio device 106 to provide services and functionality. The applications 134 may include media playback services such as music players. Other services or operations performed or provided by the applications 134 may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 106, and may implement core functionality of the audio device 106. In other embodiments, one or more of the applications 134 may be installed by the user 104, or otherwise installed after the audio device 106 has been initialized by the user 104, and may implement additional or customized functionality as desired by the user 104.

In certain embodiments, the primary mode of user interaction with the audio device 106 is through speech. For example, the audio device 106 may receive spoken commands from the user 104 and provide services in response to the commands. The user may speak a predefined wake or trigger expression (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the audio device 106, initiating Internet-based services on behalf of the user 104, and so forth.

The audio device 106 may include wake expression detection components 136, which monitor received input audio and provide event notifications to the speech processing components 120 and/or applications 134 in response to user utterances of a wake or trigger expression. The speech processing components 120 and/or applications 134 may respond by interpreting and acting upon user speech that follows the wake expression. The wake expression may comprise a word, a phrase, or other sound.

In some instances, the audio device 106 may operate in conjunction with or may otherwise utilize computing resources 138 that are remote from the environment 102. For instance, the audio device 106 may couple to the remote computing resources 138 over a network 140. As illustrated, the remote computing resources 138 may be implemented as one or more servers or server devices 142. The remote computing resources 138 may in some instances be part of a network-accessible computing platform that is maintained and accessible via a network 140 such as the Internet. Common expressions associated with these remote computing resources 138 may include "on-demand computing", "software as a service (SaaS)", "platform computing", "network-accessible platform", "cloud services", "data centers", and so forth.

Each of the servers 142 may include processor(s) 144 and memory 146. The servers 142 may perform various functions in support of the audio device 106, and may also provide additional services in conjunction with the audio device 106. Furthermore, one or more of the functions described herein as being performed by the audio device 106 may be performed instead by the servers 142, either in whole or in part. As an example, the servers 142 may in some cases provide the functionality attributed above to the speech processing components 120. Similarly, one or more of the applications 134 may reside in the memory 146 of the servers 142 and may be executed by the servers 142.

The audio device 106 may communicatively couple to the network 140 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 140 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

Although the audio device 106 is described herein as a voice-controlled or speech-based interface device, the techniques described herein may be implemented in conjunction with various different types of devices, such as telecommunications devices and components, hands-free devices, entertainment devices, media playback devices, and so forth.

Figure 2:
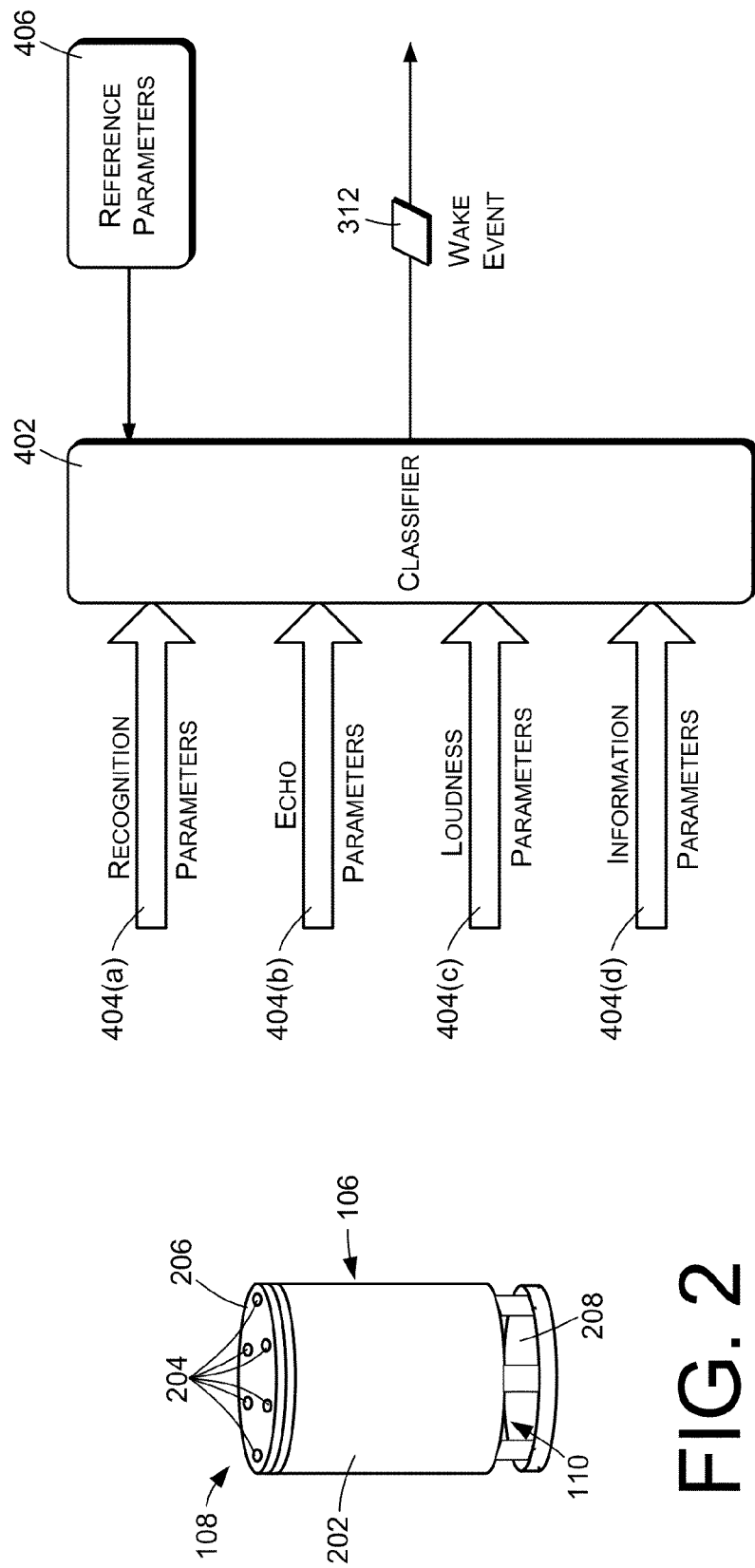
FIG. 2 is a view of a voice-controlled audio device such as might be used in the architecture of FIG. 1.

FIG. 2 illustrates details of microphone and speaker positioning in an example embodiment of the audio device 106. In this embodiment, the audio device 106 is housed by a cylindrical body 202. The microphone array 108 comprises six microphones 204 that are laterally spaced from each other so that they can be used by audio beamforming components to produce directional audio signals. In the illustrated embodiment, the microphones 204 are positioned in a circle or hexagon on a top surface 206 of the cylindrical body 202. Each of the microphones 204 is omnidirectional in the described embodiment, and beamforming technology is used to produce directional audio signals based on signals form the microphones 204. In other embodiments, the microphones may have directional audio reception, which may remove the need for subsequent beamforming.

In various embodiments, the microphone array 108 may include greater or less than the number of microphones shown. For example, an additional microphone may be located in the center of the top surface 206 and used in conjunction with peripheral microphones for producing directionally focused audio signals.

The speaker 110 may be located at the bottom of the cylindrical body 202, and may be configured to emit sound omnidirectionally, in a 360 degree pattern around the audio device 106. For example, the speaker 110 may comprise a round speaker element directed downwardly in the lower part of the body 202, to radiate sound radially through an omnidirectional opening or gap 208 in the lower part of the body 202.

Figure 3:
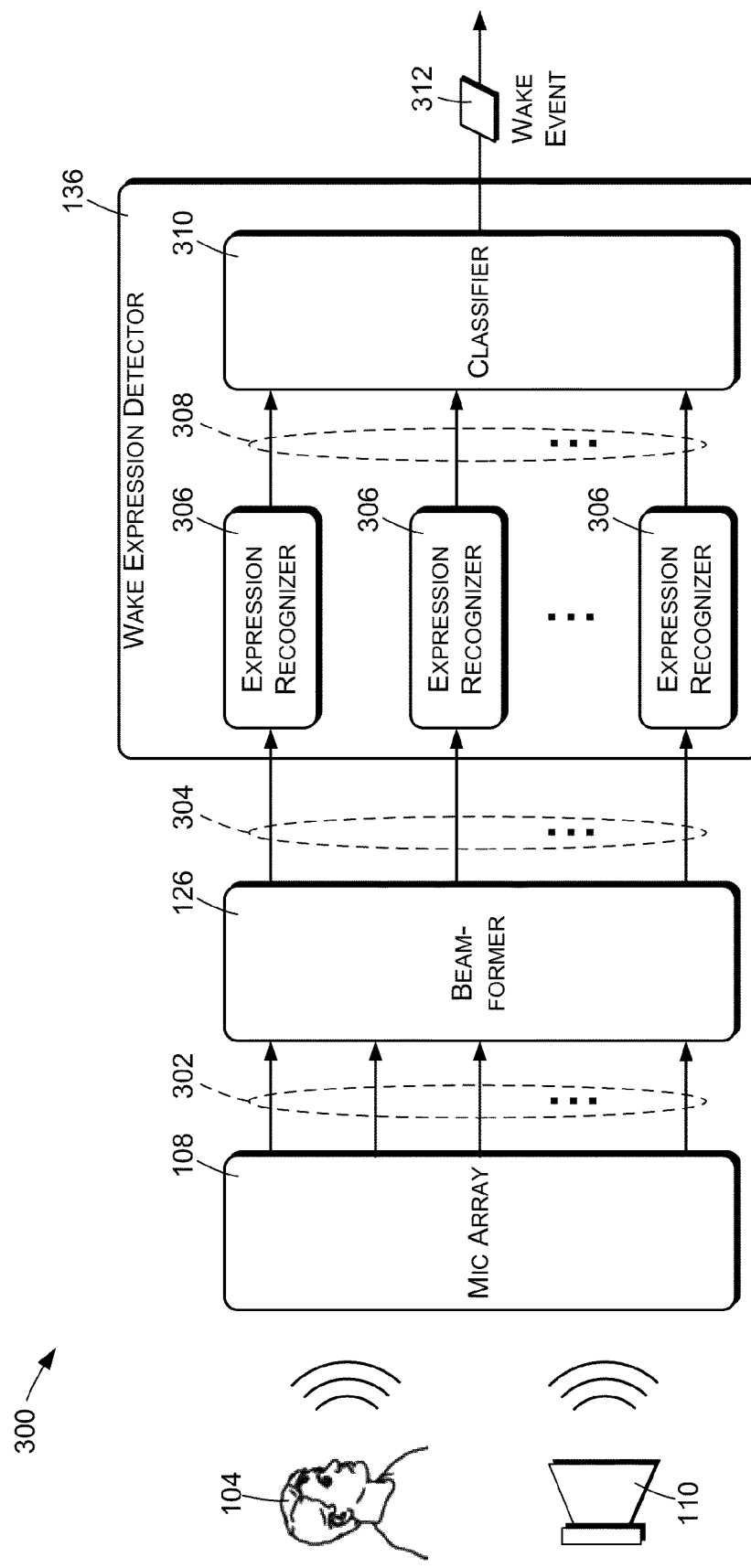

FIG. 3 illustrates an example 300 of detecting wake expressions, such as might be performed in conjunction with the architecture described above. The speaker 110 is configured to produce audio in the user environment 102. The microphone array 108 is configured as described above to receive input audio from the user environment 102, which may include speech utterances by the user 104 as well as components of audio produced by the speaker 110. The microphone array 108 produces a plurality of input audio signals 302, corresponding respectively to each of the microphones of the microphone array 108.

The audio beamformer 126 receives the input audio signals 302 and processes the signals 302 to produce a plurality of directional or directionally-focused audio signals 304. The directional audio signals 304 represent or contain input audio from the environment 102, corresponding respectively to different areas or portions of the environment 102. In the described embodiment, the directional audio signals 304 correspond respectively to different radial directions relative to the audio device 106.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

The wake expression detector 136 receives the directional audio signals 304 and detects occurrences of the wake expression in the audio represented by the individual directional audio signals 304. In the described embodiment, this is performed by multiple expression recognizers or detectors 306, corresponding respectively to each of the directional audio signals 304. The expression recognizers are configured to identify which of the directional audio signals 304 are likely to contain or represent the wake expression. In some embodiments, the expression recognizers 406 may be configured collectively to identify a set of the directional audio signals 304 in which the wake expression is detected or in which the wake expression is likely to have occurred.

Each of the expression recognizers 306 implements automated speech recognition to detect the wake expression in the corresponding directional audio signal 304. In some cases, implementation of the automated speech recognition by the expression recognizers 306 may be somewhat simplified in comparison to a full recognition system because of the fact that only a single word or phrase needs to be detected. In some implementations, however, elements or functionality provided by the speech recognition component 128 may be used to perform the functions of the expression recognizers 306.

The expression recognizers 306 produce a set of recognition indications or parameters 308 that provide indications of whether the audio of the corresponding directional audio signals 304 contain the wake expression. In some implementations, each parameter or indication 308 may comprise a binary, true/false value or parameter regarding whether the wake expression has been detected in the audio of the corresponding directional audio signal 304. In other implementations, the parameters or indications 308 may comprise confidence levels or probabilities, indicating relative likelihoods that the wake expression has been detected in the corresponding directional audio signals. For example, a confidence level may be indicated as a percentage ranging from 0% to 100%.

The wake expression detector 136 may include a classifier 310 that distinguishes between generation of the wake expression by the speaker 110 and utterance of the wake expression by the user 104, based at least in part on the parameters 308 produced by the expression recognizers 306 regarding which of the directional audio signals are likely to contain the wake expression.

In certain embodiments, each of the recognizers 306 may be configured to produce a binary value indicating whether or not the wake expression has been detected or recognized in the corresponding directional audio signal 304. Based on this binary indication, the classifier 310 identifies a set of the directional audio signals 304 that contain the wake expression. The classifier 310 then determines whether a wake expression has been generated by the speaker 110 or uttered by the user 104, based on which of the directional audio signals are in the identified set of directional audio signals.

As an example, it may be assumed in certain situations that a user-uttered wake expression will be received from a single direction or directional cone with respect to the audio device 106, and that a wake expression produced by the speaker 110 will be received from all directions or multiple directional cones. Based on this assumption, the classifier 310 may evaluate a wake expression as being generated by the speaker 110 if the wake expression is detected in all or a majority (i.e., more than half) of the directional audio signals 304. If the wake expression is detected in only one of the directional audio signals, or in a relatively small set of the directional audio signals corresponding to a single direction, the classifier 310 may evaluate the wake expression as being uttered by the user 104. For example, it may be concluded that the wake expression has been uttered by the user if the wake expression occurs in multiple directions or directional signals that are within a single cone shape extending from an apex at the audio device.

In some cases, a user-uttered wake expression may be received from more than a single direction or directional cone due to acoustic reflections within the environment 102. Accordingly, the classifier 310 may be configured to determine that a wake expression has been uttered by the user 104 if the wake expression is detected in directional audio signals corresponding to two different directions, which may be represented by two cone shapes extending from one or more apexes at the audio device. In some cases, the wake expression may be deemed to have been uttered by the user if the wake expression is found in less than all of the directional audio signals 304, or if the wake expression is found in a number of the directional audio signals 304 that is less than a threshold number. Similarly, the classifier 310 may conclude that a wake expression has been generated by the speaker 110 if all or a majority of the directional audio signals 304 are identified by the expression recognizers 306 as being likely to contain the wake expression.

In some implementations, the expression recognizers 306 may produce non-binary indications regarding whether the wake expression is likely to be present in the corresponding directional audio signals 304. For example, each expression recognizer 306 may provide a confidence level indicating the likelihood or probability that the wake expression is present in the corresponding directional audio signal 304. The classifier may compare the received confidence levels to predetermined thresholds or may use other means to evaluate whether the wake expression is present in each of the directional audio signals.

In some situations, the classifier 310 may be configured to recognize a pattern or set of the directional audio signals 304 that typically contain the wake expression when the wake expression has been generated by the speaker 110. A reference pattern or signal set may in some cases be identified in an initialization procedure by generating the wake expression at the speaker 110 and concurrently recording which of the directional audio signals 304 are then identified as containing the wake expression. The identified signals are then considered members of the reference set. During normal operation, the classifier 310 may conclude that a detected wake expression has been generated by the speaker 110 when the observed pattern or signal set has the same members as the reference pattern or signal set.

If the classifier 310 determines that a detected wake expression has been uttered by the user 104, and not generated by the speaker 110, the classifier 310 generates or provides a wake event or wake notification 312. The wake event 312 may be provided to the speech processing components 120, to the operating system 116, and/or to various of the applications 134.

FIG. 4 illustrates further techniques that may be used in some environments for evaluating whether a wake expression has been uttered by a user or has been self-generated. In this case, a classifier 402 receives various parameters 404 relating to received audio, generated audio, and other operational aspects of the audio device 106, and distinguishes between user-uttered wake expressions and self-generated wake expressions based on the parameters 404.

The parameters 404 utilized by the classifier 402 may include recognition parameters 404(a) such as might be generated by the expression recognizers 306 of FIG. 3. The recognition parameters 404(a) may comprise confidence levels corresponding respectively to each of the directional audio signals. Each of the recognition parameters 404(a) may indicate the likelihood of the corresponding directional audio signal 304 containing the wake expression. Confidence values or likelihoods may be indicated as values on a continuous scale, such as percentages that range from 0% to 100%.

The parameters 404 may also include echo or echo-related parameters 404(b) that indicate the amount of echo present in each of the directional audio signals or the amount of echo reduction that has been applied to each of the directional audio signals. These parameters may be provided by the echo cancellation component 122 (FIG. 1) with respect to each of the directional audio signals 304 or to the directional audio signals collectively. The echo-related parameters 404(b) may be indicated as values on a continuous scale, such as by percentages ranging from 0% to 100%.

The parameters 404 may also include loudness parameters 404(c), indicating the current loudness or volume level at which audio is being generated by the speaker 110 and/or the loudness of each of the received directional audio signals. As with the previously described parameters, the loudness parameters 404(c) may be indicated as values on a continuous scale, such as a percentage that ranges from 0% to 100%. Loudness may be evaluated on the basis of amplitudes of the signals, such as the amplitude of the output audio signal or the amplitudes of the input audio signals.

The parameters 404 may include informational parameters 404(d), indicating other aspects of the audio device 102. For example, the informational parameters 404(d) may indicate whether speech or other audio (which may or may not contain the wake expression) is currently being produced by the speaker 110. Similarly, the informational parameters 404(d) may indicate whether the wake expression is currently being generated by the text-to-speech component 132 of the audio device 106 or is otherwise known to be present in the output of the speaker 110.

The parameters 404 may be evaluated collectively to distinguish between wake expressions that have been uttered by a user and wake expressions that have been produced by a device speaker. As examples, the following factors may indicate the probability of a speaker-generated wake expression:

the speaker is known to be producing speech, music, or other audio;
high speaker volume;
low degree of echo cancellation;
high wake expression recognition confidence in many directions; and
high input audio volume levels from many directions.

Similarly, the following factors may indicate the probability of a user-generated wake expression:

the speaker is not producing speech, music, or other audio;

low speaker volume;

high degree of echo cancellation;

high wake expression recognition confidence in one or two of the directional audio signals; and high input audio volume levels from one or two directions.

The classifier 402 may be configured to compare the parameters 404 to a set of reference parameters 406 to determine whether a detected wake expression has been uttered by the user 104 or whether the wake expression has been generated by the speaker 110. The classifier 310 may generate the wake event 312 if the received parameters 404 match or are within specified tolerances of the reference parameters.

The reference parameters 406 may be provided by a system designer based on known characteristics of the audio device 106 and/or its environment. Alternatively, the reference parameters may be learned in a training or machine learning procedure, an example of which is described below with reference to FIG. 5. The reference parameters 406 may be specified as specific values, as values and allowed deviations, and/or as ranges of allowable values.

The wake event 312 may comprise a simple notification that the wake expression has occurred. Alternatively, the wake event 312 may comprise or be accompanied by information allowing the audio device 106 or applications 134 to evaluate whether the wake expression has occurred. For example, the wake event 312 may indicate or be accompanied by a confidence level, indicating the evaluated probability that the wake expression has occurred. A confidence level may indicate probability on a continuous scale, such as from 0% to 100%. The applications 134 may respond to the wake event in different ways, depending on the confidence level. For example, an application may respond to a low confidence level by lowering the volume of output audio so that a repeated utterance of the wake expression is more likely to be detected. As another example, an application may respond to a wake event having a low confidence level by verbally prompting the user for confirmation. As another example, an application may alter its behavior over time in light of receiving wake events with low confidence levels.

The wake event 312 may indicate other information. For example, the wake event 312 may indicate the identity of the user who has uttered the wake expression. As another example, the wake event 312 may indicate which of multiple available wake expressions has been detected. As a further example, the wake event 312 may include recognition parameters 404 or other parameters based on or related to the recognition parameters 404.

Figure 5:
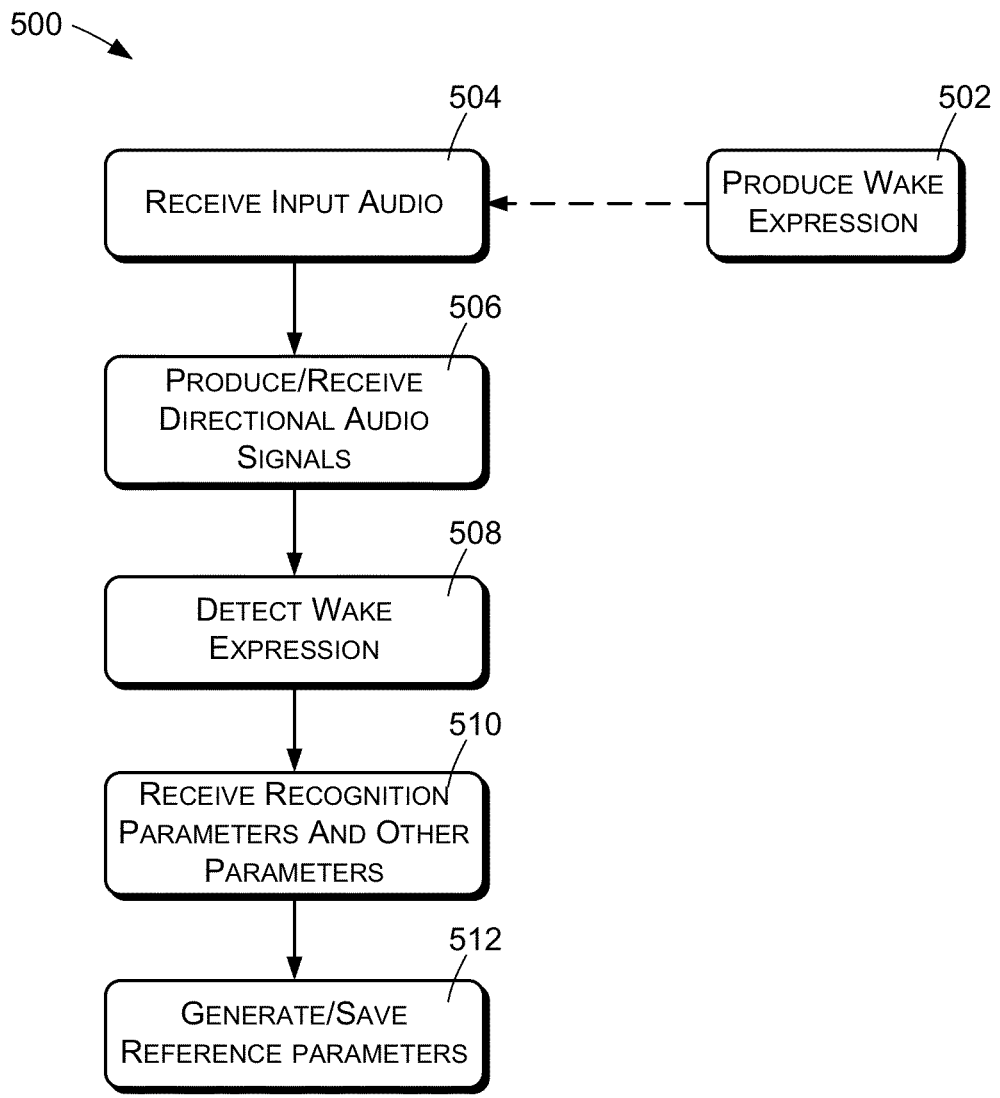
FIG. 5 is a flow diagram illustrating an example process for learning reference parameters, which may be used to detecting device-produced wake expressions.

FIG. 5 illustrates an example method 500 that may be used to learn or generate the reference parameters 406. In some cases, the example method 500 may be implemented as machine learning to dynamically learn which of the directional audio signals are likely to contain the wake expression when the wake expression is known to occur in the output audio. In other cases, the example method may be implemented as machine learning to dynamically learn various parameters and/or ranges of parameters that may be used to detect generation of the wake expression by the speaker 110 of the audio device 106.

An action 502 comprises producing or generating the wake expression at the speaker 110. The action 502 may be performed upon startup or initialization of the audio device 106 and/or at other times during operation of the audio device 106. In some implementations, the action 502 may comprise generating the wake expression as part of responding to user commands. For example, the wake expression may be contained in speech generated by the speech generation component 132, and may be generated as part of providing services or responses to the user 104. The audio device 106 may be configured to learn the reference parameters or to refine the reference parameters in response to any such known generation of the wake expression by the speaker 110.

An action 504 comprises receiving input audio at the microphone array 108. Because of acoustic computing between the speaker 110 and the microphone array 108, the input audio contains the wake expression generated in the action 502.

An action 506 comprises producing and/or receiving directional audio signals based on the received input audio. The directional audio signals may in some embodiments be produced by beamforming techniques. In other embodiments, the directional audio signals may be produced by other techniques, such as by directional microphones or microphones placed in different areas of a room.

An action 508 comprises performing wake expression detection with respect to each of the produced or received directional audio signals. The action 508 may comprise evaluating the produced or received directional audio signals to generate respectively corresponding indications of whether the directional audio signals contain the wake expression. Detection of the wake expression in an individual directional audio signal may be indicated by recognition parameters as described above, which may comprise binary values or non-binary probabilities.

An action 510 comprises receiving recognition parameters, such as the recognition parameters 404(a) described above with reference to FIG. 4, which may include the results of the wake expression detection 508. In some implementations, the recognition parameters may indicate a set of the directional audio signals in which the wake expression has been detected. In other implementations, the recognition parameters may comprise probabilities with respect to each of the directional audio signals, where each probability indicates the likelihood that the corresponding directional audio signal contains the wake expression.

The action 510 may also comprise receiving other parameters or indications, such as the echo parameters 404(b), the loudness parameters 404(c), and the information parameters 404(d), described above with reference to FIG. 4.

An action 512 may comprise generating and saving a set of reference parameters, based on the parameters received in the action 510. The reference parameters may include the values of the parameters 404 at the time the wake expression is detected. The method 500 may be performed repeatedly or continuously, during operation of the audio device, to tune and retune the learned reference parameters.

Figure 6:
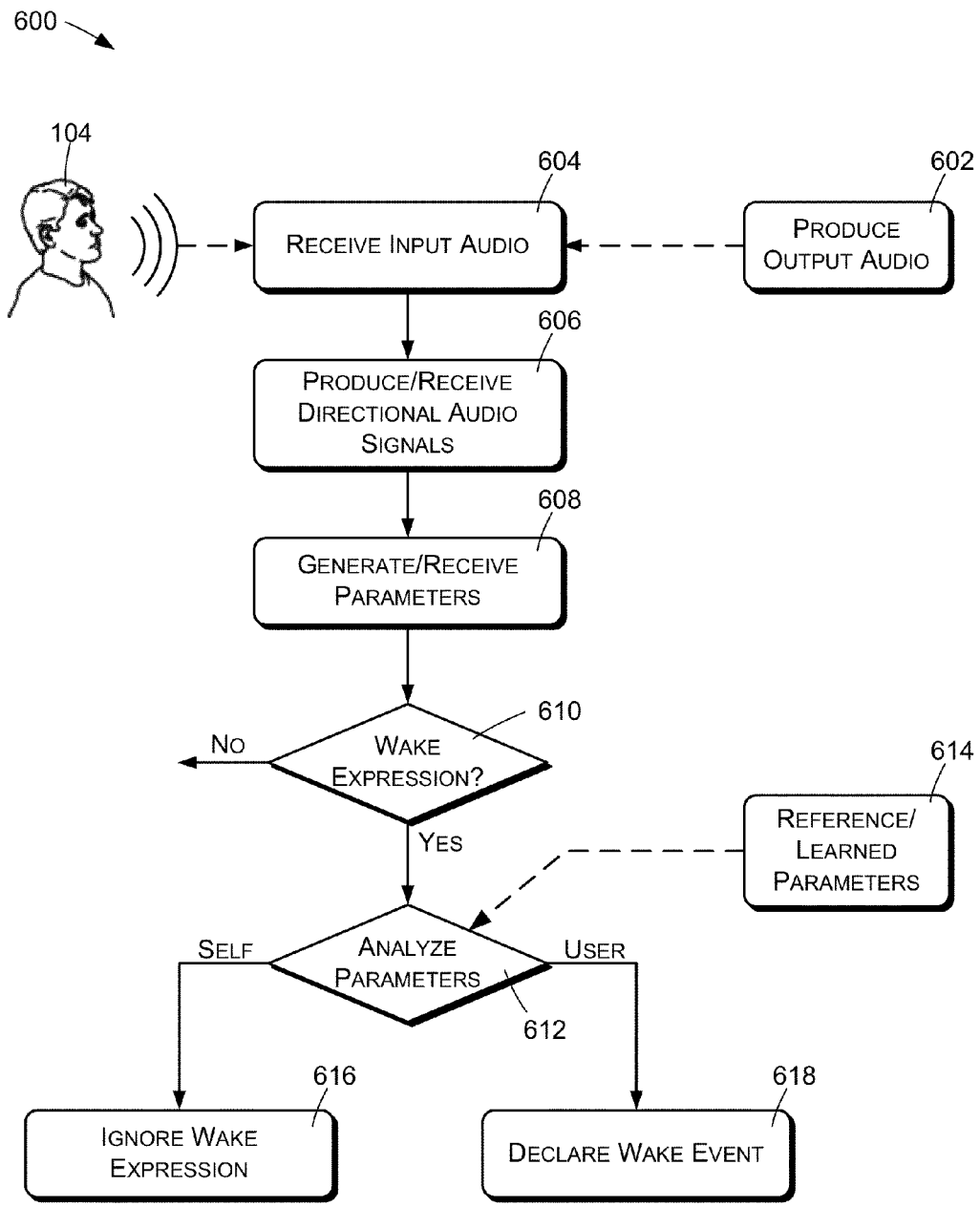
FIG. 6 is a flow diagram illustrating an example process for discriminating between user-uttered wake expressions and device-produced wake expressions.

FIG. 6 shows a process 600 of detecting a wake expression and determining whether it has been uttered by the user 104 or generated by the audio device 106.

An action 602 comprises producing output audio at the speaker 110 in the user environment 102. The output audio may comprise generated speech, music, or other content, which may be generated by the audio device 106 or received from other content sources. The output audio may from time to time include the wake expression.

An action 604 comprises receiving input audio, which may include components of the output audio due to acoustic coupling between the speaker 110 and the microphone array 108. The input audio may also include speech uttered by the user 104, which may include the wake expression.

An action 606 comprises producing and/or receiving a plurality of directional audio signals corresponding to input audio from different areas of the user environment 102. The directional audio signals contain audio components from different areas or portions of the user environment 102, such as from different radial directions relative to the audio device 106. The directional audio signals may be produced using beamforming techniques based on an array of non-directional microphones, or may be received respectively from a plurality of directional microphones.

An action 608 comprises generating and/or receiving device parameters or indications relating to operation of the audio device 106. In some embodiments, the action 608 may comprise evaluating the directional audio signals to generate respectively corresponding recognition parameters or other indications of whether the directional audio signals contain the wake expression. The parameters or indications may also include parameters relating to speech generation, output audio generation, echo cancellation, etc.

An action 610 comprises evaluating the device parameters or indications to determine whether the wake expression has occurred in the input audio, based at least in part on expression recognition parameters. This may comprise determining whether the wake expression has occurred in any one or more of the directional audio signals, and may be performed by the individual expression recognizers 306 of FIG. 3.

If the wake expression has not occurred, no further action is taken. If the wake expression has occurred in at least one of the directional audio signals, an action 612 is performed. The action 612 comprises determining when a detected occurrence of the wake expression in the input audio is a result of the wake expression occurring in the output audio and/or of being produced by the speaker 110 of the audio device 106. The action 612 is based at least in part on the recognition parameters generated by the action 608.

In some embodiments, the determination 612 may be made in light of the number or pattern of the directional audio signals in which the wake expression is found. For example, detecting the wake expression in all or a majority of the directional audio signals may be considered an indication that the wake expression has been generated by the speaker 110, while detection of the wake expression in less than a majority of the directional audio signals may be considered an indication that the wake expression has been generated by a user who is located in a particular direction relative to the audio device 106. As another example, the action 612 may comprise identifying a number of the directional audio signals that are likely to contain the wake expression, and comparing the number to a threshold. More specifically, the wake expression may be considered to have been uttered by the user if the number of directional signals identified as being likely to contain the threshold is less than or equal to a threshold of one or two.

As another example, the action 612 may comprise identifying a set of the directional audio signals that are likely to contain the wake expression and comparing the identified set to a predetermined set of the directional audio signals, wherein the predetermined set includes directional audio signals that are known to contain the wake expression when the wake expression occurs in the output audio. The predetermined set may be learned in an initialization process or at other times when the audio device 106 is known to be producing the wake expression. More particularly, a learning procedure may be used to determine a particular set of the directional audio signals which can be expected to contain the wake expression when the wake expression has been produced from the speaker 110. Similarly, a learning procedure may be used to determine a pattern or group of the directional audio signals which can be expected to contain the wake expression when the wake expression has been uttered by the user.

As another example, the pattern of directional audio signals in which the wake expression is detected may be analyzed to determine whether the wake expression was received as an omnidirectional input or whether it was received from a single direction corresponding to the position of a user. In some cases, a user-uttered wake expression may also be received as an audio reflection from a reflective surface. Accordingly, a wake expression originating from two distinct directions may in some cases be evaluated as being uttered by the user.

Certain embodiments may utilize more complex analyses in the action 612, with reference to a set of reference parameters 614. The reference parameters 614 may be specified by a system designer, or may comprise parameters that have been learned as described above with reference to FIG. 5. The reference parameters may include expression recognition parameters indicating which of the directional audio signals contain or are likely to contain the wake expression. The reference parameters may also include parameters relating to speech generation, output audio generation, echo cancellation, and so forth. Machine learning techniques, including neural networks, fuzzy logic, and Bayesian classification, may be used to formulate the reference parameters and/or to perform comparisons of current parameters with the reference parameters.

Learned reference parameters may be used in situations in which the audio produced by or received from a device speaker is not omnidirectional. Situations such as this may result from acoustic reflections or other anomalies, and/or in embodiments where the speaker of a device is directional rather than omnidirectional. In some embodiments, a beamforming speaker, sometimes referred to as a sound bar, may be used to customize speaker output for optimum performance in the context of the unique acoustic properties of a particular environment. For example, the directionality of the speaker may be configured to minimize reflections and to optimize the ability to detect user uttered audio.

If the action 612 determines that a detected wake expression has been produced by the speaker 110, an action 516 is performed, which comprises ignoring the wake expression. Otherwise, if the action 612 determines that the detected wake expression has been uttered by the user 104, an action 618 is performed. The action 618 comprises declaring a wake event. The audio device 106 may respond to a declared wake event by interpreting and acting upon subsequently detected user speech.

The embodiments described above may be implemented programmatically, such as with computers, processors, as digital signal processors, analog processors, and so forth. In other embodiments, however, one or more of the components, functions, or elements may be implemented using specialized or dedicated circuits, including analog circuits and/or digital logic circuits. The term "component", as used herein, is intended to include any hardware, software, logic, or combinations of the foregoing that are used to implement the functionality attributed to the component.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. An audio device configured to respond to a trigger expression uttered by a user, comprising:
   a speaker configured to generate output audio;
   a microphone array configured to produce a plurality of input audio signals;
   an audio beamformer configured to produce a plurality of directional audio signals based at least in part on the input audio signals, wherein the directional audio signals represent audio from respectively corresponding directions relative to the audio device;
   one or more speech recognition components configured to detect that the trigger expression occurs in the audio represented by each of the respective directional audio signals; and
   an expression detector configured to:
      identify two or more directional audio signals, of the plurality of directional audio signals, that each include the trigger expression,
      determine that a total number of the two or more directional audio signals is less than a threshold number,
      in response to determining that the total number of the two or more directional audio signals is less than the threshold number, determine that the occurrence of the trigger expression in the audio is a result of an utterance of the trigger expression by a user, and
      based at least in part on determining that the occurrence of the trigger expression in the audio is a result of an utterance of the trigger expression by the user, provide a wake notification corresponding to the trigger expression to at least one processor of the audio device to change a state of the audio device.

2. The audio device of claim 1, wherein the expression detector is further configured to determine that the trigger expression has been uttered by the user if the trigger expression occurs in the audio from multiple directions that are within a single cone shape extending from an apex at the audio device.

3. The audio device of claim 1, wherein the expression detector is further configured to determine that the trigger expression has been uttered by the user if the trigger expression occurs in the audio from multiple directions that are within two cone shapes extending from apexes at the audio device.

4. The audio device of claim 1, wherein the expression detector is further configured to determine that the trigger expression has been generated by the speaker if the trigger expression occurs in the audio represented by more than half of the plurality of directional audio signals.

5. A method comprising:
   producing, by a speaker included in an audio device, output audio in a user environment;
   receiving, from a microphone array of the audio device, a plurality of audio signals representing input audio;
   generating, for each of the plurality of audio signals, a recognition parameter indicating whether a corresponding audio signal includes a predefined expression;
   identifying, based at least in part on the recognition parameters, two or more audio signals, of the plurality of audio signals, that include the predefined expression;
   determining that a total number of the two or more audio signals is more than a threshold number; and
   based at least in part on the determining that the total number of the two or more audio signals is more than the threshold number, determining that an occurrence of the predefined expression in the input audio is a result of the predefined expression occurring in the output audio from the speaker.

6. The method of claim 5, wherein the identifying the two or more audio signals includes determining that all of the plurality of audio signals include the predefined expression.

7. The method of claim 5, further comprising:
   determining that the two or more audio signals and a reference signal set have the same one or more members, wherein the reference signal set has one or more members comprising one or more of the audio signals that contain the predefined expression during an occurrence of the predefined expression in the output audio,
   wherein the determining that the occurrence of the predefined expression in the input audio is the result of the predefined expression occurring in the output audio from the speaker is based at least in part on the determining that the two or more audio signals and the reference signal set have the same one or more members.

8. The method of claim 7, further comprising identifying the one or more members of the reference signal set during a known occurrence of the predefined expression in the output audio, wherein the one or more members of the reference signal set comprise one or more of the audio signals that are indicated by the recognition parameters to include the predefined expression during the known occurrence of the predefined expression in the output audio.

9. The method of claim 5, wherein the recognition parameters indicate one or more of the following:
   loudness of the output audio;
   whether the output audio is known to contain speech;
   loudness of the input audio; or
   echo characteristics of the audio signals.

10. The method of claim 9, further comprising using machine learning to perform the determining that the occurrence of the predefined expression in the input audio is the result of the predefined expression occurring in the output audio from the speaker.

11. The method of claim 5, wherein each of the recognition parameters indicates a probability of the predefined expression being present in a corresponding audio signal.

12. An audio device comprising:
   one or more processors;
   a plurality of microphones;
   an audio speaker configured to produce output audio;
   memory storing computer-executable instructions that, when executed by the one or more processors, cause the one or more processors to perform acts comprising:
      receiving, from the plurality of microphones, a plurality of audio signals representing input audio;
      generating, by the one or more processors for each of the plurality of audio signals, an indication indicating whether a corresponding audio signal contains a predefined expression;
      generating a parameter that indicates at least one of whether or not the output audio is currently being produced, whether or not the output audio contains speech, loudness of the output audio, or an echo characteristic of one or more of the plurality of audio signals;
      identifying, based at least in part on the indications, two or more audio signals, of the plurality of audio signals, that include the predefined expression;

determining, based at least in part on the two or more audio signals and the parameter, that an occurrence of the predefined expression in the input audio is a result of an utterance of the predefined expression by a user; and in response to the determining, providing a wake notification corresponding to the predefined expression to the one or more processors to change a state of the audio device.

13. The audio device of claim 12, wherein each of the indications comprises a binary parameter indicating whether the predefined expression occurs in the corresponding audio signal.

14. The audio device of claim 12, wherein each of the indications comprises a probability that the predefined expression occurs in the corresponding audio signal.

15. The audio device of claim 12, the acts further comprising:

determining that the two or more audio signals and a reference signal set have the same one or more members, wherein the one or more members of the reference signal set comprise one or more of the audio signals that contain the predefined expression during production of the predefined expression by the audio speaker.

16. The audio device of claim 15, the acts further comprising identifying the one or more members of the reference signal set during known production of the predefined expression by the audio speaker, wherein the one or more members of the reference signal set comprise one or more of the audio signals that are indicated by the indications to contain the predefined expression during the known production of the predefined expression by the audio speaker.

17. The one audio device of claim 12, wherein the wake notification indicates a probability that the predefined expression has been uttered by the user.

* * * * *